(No Model.) 2 Sheets—Sheet 2.
J. F. STEWARD.
MOWER.
No. 596,796. Patented Jan. 4, 1898.
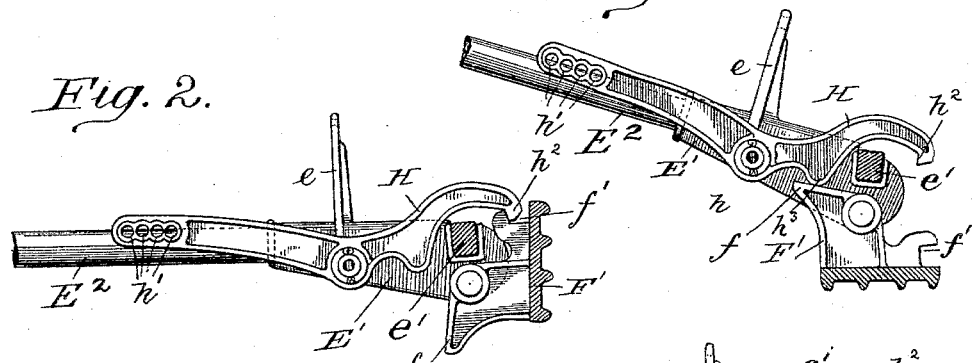
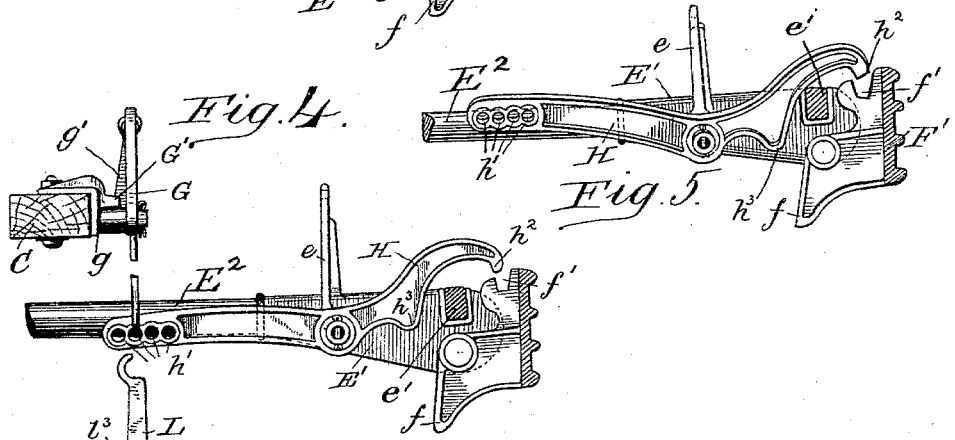
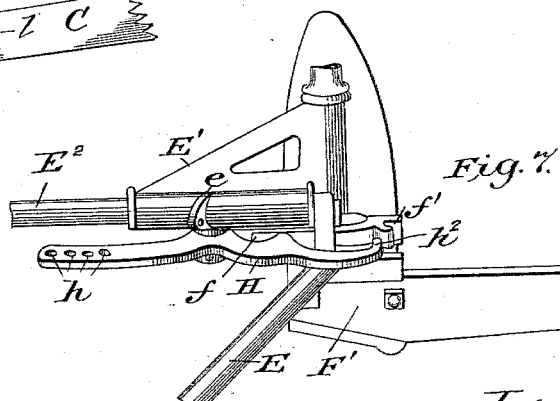
Witnesses
Arthur Johnson
H. Tracy
Inventor.
John F. Steward

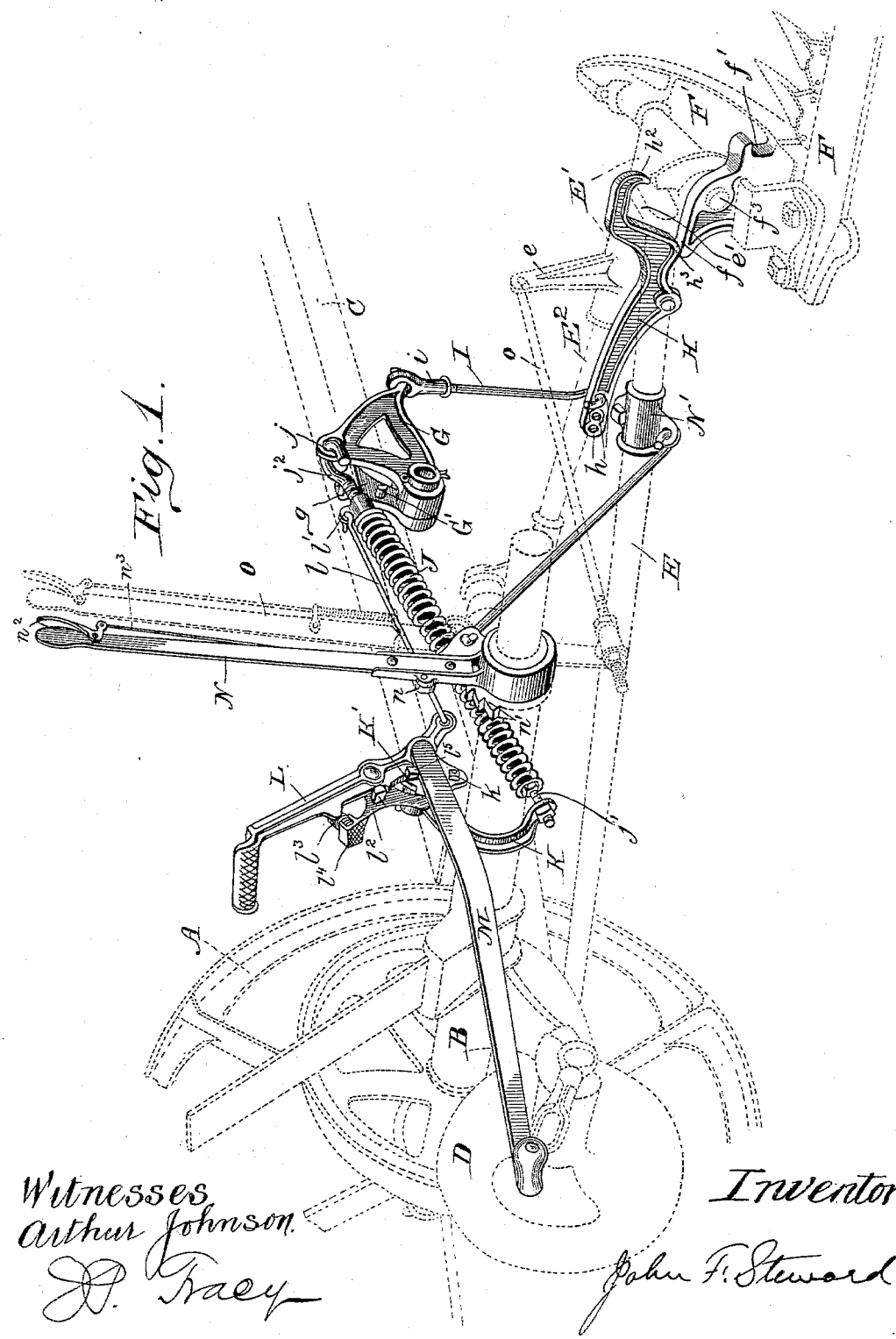

UNITED STATES PATENT OFFICE.

JOHN F. STEWARD, OF CHICAGO, ILLINOIS.

MOWER.

SPECIFICATION forming part of Letters Patent No. 596,796, dated January 4, 1898.

Application filed July 6, 1897. Serial No. 643,527. (No model.)

*To all whom it may concern:*

Be it known that I, JOHN F. STEWARD, of Chicago, in the county of Cook and State of Illinois, have invented certain new and useful Improvements in Mowers, of which the following is a full description, reference being had to the accompanying drawings, in which—

Figure 1 is a perspective view of my improvements, which are shown as applied to an ordinary mower, the latter being shown in dotted lines. Figs. 2 to 7, inclusive, are details.

The object of my invention is to provide that the sustaining-spring, the lifting apparatus, and the locking device may be easily controlled. In short, the object is to make the machine handy not only when the driver is in his seat, but when he is on the ground oiling up, folding, or unfolding the bar. To this end I provide a foot lifting-lever and a coöperating hand lifting-lever sufficiently near the position of the driver to be controlled and an added lifting-lever that may be used for lifting the cutting apparatus independent of the foot-lever. The lever that coöperates, when required, with the foot-lever is connected to the coupling-frame, and the independent hand-lever is also connected so that each coöperates with the gag-lever in so far as the gag-lever is also made to operate as the hook for holding the cutting apparatus in an elevated position. In so far as these jointly coöperate with the "bar-lock," as it may be termed, will be made clear by the statement that when the bar is folded upwardly the latch may be unhooked by one when it is not convenient to do so by the other—that is to say, if the parts of the mower are in a certain adjustment the latch can be controlled by the tilting-lever, and when in a position of adjustment that it cannot be controlled by the tilting-lever it can be forced to unhook by the special hand lifting-lever.

In the drawings, A is the stubble-side supporting-wheel.

B is the main frame.

C is the tongue, and D the gearing.

The coupling-frame, having the two parts E and $E^2$, is pivoted to the main frame in a usual manner, and the cutting apparatus F is pivoted to the coupling-bar by means of the hinge-piece or swivel $E'$, which is connected to the shoe $F'$ by a fore-and-aft pivotal pin $f^3$.

As far as described the parts may be considered as representing any well-known form of mower and for that reason will require no further description.

Pivoted to a bracket $g$, which is secured to the tongue, is a bell-crank G. A gag-lever H is pivoted on the coupling-frame. In order that it may perform added functions, I pivot it in this instance to the swivel $E'$, which in turn is pivoted on the coupling-frame. The gag-lever bears by its part $h^3$ against an arm $f$ of the shoe $F'$. This gag-lever is connected to the bell-crank G by a rod I, which is preferably made adjustable in length by being screwed into a socket $i$, that hooks onto the said bell-crank. The sustaining-spring J connects to the bell-crank G at $j$, and its opposite end is held, preferably by a bolt $j'$, to a bracket K, that is bolted, conveniently at $k$, to the tongue and which extends conveniently around the axle-sleeve of the main frame, as best shown in Fig. 1. The bolt $j'$ serves the usual purpose of providing for the adjustment of the tension of the spring J, so that the weight of the cutter-bar can be partly sustained and poised as it is drawn over the ground.

A foot-lever L is pivoted conveniently upon the bracket K and is connected by a rod $l$ to a sleeve $l'$, threaded upon the hook-bolt $j^2$ at the forward end of the spring J. The sleeve $l'$ is made adjustable upon the bolt $j^2$ in order to compensate for any variation in the height of the forward end of the tongue. As will be explained, it is usual to adjust the various parts of a lifting apparatus to an average height of the tongue, which is, say, thirty-two inches. If the tongue is hinged at a height of, for instance, thirty-eight inches, the sleeve $l'$ will be moved in effect farther away from the lever L, which will be caused to swing so far backward at its upper end that the pressure of the foot cannot move it. To overcome this, the sleeve $l'$ is adjusted along the length of the hook-bolt $j^2$, so as to bring the lever L and its pawl into a proper position relative to the seat. If the tongue should be adjusted lower than thirty-two inches, the opposite results would be obtained and the sleeve $l'$ would have to be adjusted in the opposite direction. Stress applied upon the foot-lever L serves to raise the cutter-bar as a whole by raising the coupling-bar upon its pivots by means of the bell-crank G, the rod I, and gag-lever H, and the pressure of the gag-lever upon the arm $f$ serves to raise the outer end of the cutting apparatus to a greater or less extent. There may be a plurality of holes of adjustment $h$ of the gag-lever, into which the connecting-rod I can be hooked to provide for the attachment of finger-bars of various lengths.

Pivoted to the foot-lever L is the latch $l^2$, held into engagement with the quadrant K by the spring $l^3$. A foot-pad $l^4$ is formed upon this latch, so that it can be disengaged by pressure brought to bear upon it by the operator. A hand raising-lever M coöperates with the foot-lever and is pivoted, preferably, coincident therewith in the bracket K. Usually it is only necessary to use the foot-lever in raising the cutting apparatus when using the machine—for instance, in turning a corner or in passing over an obstruction. The hand-lever being pivoted loosely in the hub of the foot-lever L is not moved when the foot-lever is moved, except at such times when it is desired to use the hand-lever, when it will strike the lug $l^5$ on the foot-lever and carry the said lever with it to a latching position.

The supplemental hand-lever N is preferably pivoted upon the axle-sleeve and has the pawl $n$, adapted to engage a ratcheted quadrant $n'$, and disengaged therefrom by means of the finger-lever $n^2$ and the rod $n^3$ in the usual manner. A rod having hooks at each end connects this hand-lever to a collar N', secured to the coupling-frame. If desired at any time, this hand-lever can be used to raise the cutter-bar.

O is the tilting-lever, conveniently pivoted to the main frame and connected by a rod $o$ to an arm $e$ on the swivel E'. (All shown in dotted lines in Fig. 1.) The said rod $o$ is preferably adjustable in length in order that the amount of tilt given to the cutting apparatus may be varied to suit the conditions. By means of this last-described device the points of the guards can be tilted to and from the ground. The tilting apparatus has an added function. The grassward end of the gag-lever H has a hook $h^2$ formed thereon, which is adapted to hook into the catch $f'$ in the shoe F' when the cutter-bar is folded to an upright position for traveling on the road to hold it in that position. This is best shown in Fig. 2. By pushing the tilting-lever forward the swivel will be rocked rearwardly and the lever H will strike the part $e'$ of the coupling-frame, thus raising the hook out of engagement with the catch, as shown in Fig. 5. If, however, the parts should be adjusted so that the cutting apparatus could not be tilted far enough for the gag-lever to be pushed out of engagement with the notch by striking the coupling-frame, the supplemental lever N could be used for the purpose of disengaging the cutting apparatus from the hook on the gag-lever.

A stop G' will be noticed as being part of the bracket $g$. One of the purposes of this stop is to limit the height to which the cutter-bar can be raised by the foot-lever, as shown in Fig. 4. If the cutter-bar is raised by the lever N high enough for the flange $g'$ of the lever G to strike the stop G', continued stress upon the lever N will in effect force the connecting-rod I downward, (because the bell-crank G can go no farther, owing to the stop,) and the downward pressure on the rod I will move the hook $h'$ out of engagement with the notch $f'$, thus allowing the cutting apparatus to be brought to a horizontal position.

When the machine is used in Europe, it is required that the cutting apparatus be tilted very low and not very high, and when it is used in the boggy lands of this country the cutting apparatus has to be tilted very high and not very low. An adjustment of the rod $o$ is provided whereby the machine may be adapted to operate under either condition. This adjustment disturbs the action of the gag-lever as a lock, so as to make the added lever N desirable. Under the former conditions the parts would be adjusted so that the gag-lever could not strike the part $e'$ of the coupling-frame when the cutting apparatus is tilted up in an effort to force the hook $h^2$ out of engagement with the catch $f'$, and at that time and when so adjusted the cutting apparatus could only be disengaged from the gag-lever by the use of the supplemental lever N, as before described. When the cutting apparatus is adapted to be tilted very high, as for cutting over boggy ground, the tilting-lever O could then be used to rock the swivel E, carrying with it the gag-lever H sufficient to make it strike the coupling-frame and force disengagement. Again, should the operator be standing around the machine it would be oftentimes more convenient for him to use the lever N than the lever O, particularly when the latter is well forward and consequently partly out of reach, while, on the other hand, if he were in the seat the lever O would be usually the most convenient to use.

It will be understood that if machines are made to suit the conditions met with in any one given territory where those conditions are constant the supplemental lever N might be dispensed with and the dependence for unlocking the bar when folded be placed wholly upon the tilting-lever O. Let it be understood that the gag-lever may be forced out of engagement with the catch by means of stress applied thereto produced both by the lever N and by the lever O. Each of these levers is connected with the gag-lever so that disengagement can be made. In some of the claims the combination of the two levers with the locking gag-lever and other elements making the elements mentioned effective is claimed.

What I claim as my invention, and desire to secure by Letters Patent, is—

1. In a mowing-machine, a bar-lifting and bar-locking device consisting of the following mechanical elements in combination with the main supporting-frame, coupling-frame, and finger-bar, namely: the swivel E' pivotally supported upon the grain end of portion E² of the coupling-frame, said swivel connected to the shoe of the finger-bar by a pivot-pin $f^3$, by which means the finger-bar may be rocked and also permitted to be raised to a vertical position, a gag-lever pivoted to said swivel and adapted to press upon an arm extending from the shoe, a lifting-lever linked to the free end of the said gag-lever, the said gag-lever also having a catch formed as one piece upon it, the inner end of the finger-bar having a part formed upon it adapted to be engaged by the catch on the said gag-lever, all of these parts so arranged that when the finger-bar is folded to a substantially vertical position the catch $h^2$ is forced to a position of engagement with the coöperating catch upon the shoe of the finger-bar, all combined substantially as described.

2. The combination with the main frame, coupling-frame, and finger-bar, the latter pivotally connected to the former and thus adapted to be folded to a substantially vertical position, a gag-lever pivoted to the said coupling-frame and adapted to press upon an arm formed upon the shoe of the finger-bar when the latter is in its working position, a catch formed upon the said gag-lever and a coöperating catch formed upon the shoe of the finger-bar, a lifting mechanism connecting to the free end of said gag-lever, a stop against which the lifting mechanism may strike and prevent upward movement to a further extent than desirable, and a supplemental lifting-lever as N, connected to the coupling-frame, whereby by means of the said supplemental lifting-lever the coupling-frame can be raised to a still higher position than that to which it is brought by the lifting mechanism which operates through the gag-lever, and the catch of the gag-lever thus forced out of engagement with the coöperating catch on the shoe, and the cutting apparatus thus be permitted to be lowered to its horizontal position, substantially as described.

3. The combination with the main frame, coupling-frame and finger-bar, the latter pivotally connected to the former and thus adapted to be folded to a substantially vertical position, a gag-lever pivoted to the said coupling-frame and adapted to press upon an arm formed upon the shoe of the finger-bar when the latter is in its working position, a catch formed upon the said gag-lever and a coöperating catch formed upon the shoe of the finger-bar, a sustaining mechanism connecting to the free end of said gag-lever, a stop against which the sustaining mechanism may strike and prevent upward movement to a further extent than desirable, and a lifting-lever as N, connected to the coupling-frame whereby by means of the said lifting-lever the coupling-frame can be raised to a still higher position than that to which it is brought by the sustaining mechanism which operates through the gag-lever, and the catch of the gag-lever thus forced out of engagement with the coöperating catch on the shoe and the cutting apparatus thus be permitted to be lowered to its horizontal position, substantially as described.

4. The combination with the main supporting-frame, coupling-frame and finger-bar of the gag-lever pivoted to the coupling-frame and provided with the part $h^3$ and the hook $h^2$, the shoe of the finger-bar provided with the arm $f$ and the catch $f'$ as one part therewith, the free end of said gag-lever connected to suitable lifting apparatus, or arranged and combined so that the gag-lever may have the effect of lifting the finger-bar at its outer end simultaneously with the act of lifting the inner end, and by movement on its fulcrum be made to engage with the catch on the finger-bar to sustain the latter in its vertical position and to unlatch when the latter is to be lowered, substantially as described.

5. The combination with the main supporting-frame, the coupling-frame and the finger-bar of a mowing-machine, the latter pivoted to the coupling-frame on a substantially horizontal axis, of a gag-lever pivoted to the said coupling-frame, its free end supported from the main frame, its working end adapted to engage an arm on the finger-bar adjacent to its joint, said gag-lever also having a part as one piece therewith adapted to engage the finger-bar at a point adjacent to its joint and hold it when folded to a substantially vertical position, said part adapted to engage said finger-bar and be disengaged therefrom by a movement of the fulcrum of said lever, substantially as described.

6. The combination with the main supporting-frame, coupling-frame and finger-bar of a mowing-machine, the latter pivoted to the said coupling-frame on a substantially horizontal axis, of a gag-lever pivoted to the said coupling-frame, its free end supported from the main frame, its working end adapted to engage an arm on the finger-bar adjacent to the joint which connects the latter to the coupling-frame, said gag-lever having a catch adapted to engage a coöperating catch on the finger-bar and hold it in its folded position and means for forcing the catch of the gag-lever from engagement with the catch on the finger-bar by moving the said gag-lever on its fulcrum, and thus permit the finger-bar to be lowered, substantially as described.

7. The combination with the main supporting-frame, the coupling-frame and the finger-bar of a mowing-machine, of a gag-lever pivoted to the said coupling-frame, its free end supported from the main frame, its working end adapted to engage an arm on the finger-bar adjacent to the joint which connects the latter to the coupling-frame, said gag-lever having a catch adapted to engage a coöperating catch on the finger-bar and hold the latter in its folded position, a stop for preventing the free end of said gag-lever from being raised beyond a definite height, and means for raising the coupling-frame to a still higher position whereby the catch of the gag-lever is forced from engagement with the coöperating catch on the finger-bar, all combined substantially as described.

8. The combination with the main supporting-frame, the coupling-frame and the finger-bar, the said finger-bar hinged to the said coupling-frame by a substantially horizontal pivot, a gag-lever pivoted to said coupling-frame and having the part $h^3$ and the hook $h^2$, the shoe of said finger-bar having the arm $f$ and the catch $f'$, suitable lifting mechanism to which the free end of said gag-lever is connected, and a tilting device adapted to rock said gag-lever against the thrust-bar portion of the said coupling-frame whereby it is rocked and forced to release its catch $h^2$ from the said catch $f'$ upon the shoe of the finger-bar, and thus allow the finger-bar to be lowered to a substantially horizontal position, substantially as described.

9. The combination with the main supporting-frame, the coupling-frame and the finger-bar, the latter connected to the said coupling-frame by means of a swivel having transverse joints whereby the cutting apparatus may be rocked upon one joint and folded to a substantially vertical position on the other joint, of a locking-lever fulcrumed on said swivel and having one end connected to the main frame by a supporting linking mechanism with a stop to prevent a greater upward movement of the said locking-lever than desired, said locking-lever provided with a catch, the shoe of the finger-bar provided with a coöperating catch, said locking-lever adapted to strike the coupling-frame when the swivel is rocked and its catch thus forced to disengage from the coöperating catch on the finger-bar, a tilting-lever O connected to the swivel so as to rock it upon the coupling-frame and force said disengagement, and also a lifting device, as N, connected directly to the coupling-frame and adapted to raise the said coupling-frame so high that the said supporting-link may strike its stop and by further upward movement of the coupling-frame force the catch of the locking-lever from engagement with the coöperating catch on the shoe of the finger-bar, all arranged substantially as described so that the operator may use whichever lever is in most convenient reach from his position, whether sitting on the machine or standing on the ground, substantially as described.

JOHN F. STEWARD.

Witnesses:
ARTHUR JOHNSON,
J. P. TRACY.